US006475637B1

United States Patent
Strutt et al.

(10) Patent No.: US 6,475,637 B1
(45) Date of Patent: Nov. 5, 2002

(54) LIQUID INTERFACE DIFFUSION BONDED COMPOSITION AND METHOD

(75) Inventors: Andrew J. Strutt, La Jolla, CA (US); Brian Norris, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 131 days.

(21) Appl. No.: 09/736,774

(22) Filed: Dec. 14, 2000

(51) Int. Cl.$^7$ .............................. B32B 3/12; B32B 15/01; B23K 101/02; B23K 35/32; B23K 103/14

(52) U.S. Cl. ..................... 428/593; 428/660; 228/181; 228/262.71; 228/262.72; 228/194; 228/195

(58) Field of Search ................................. 428/600, 593, 428/660; 228/181, 262.71, 262.72, 193, 194, 195

(56) References Cited

U.S. PATENT DOCUMENTS

| 3,768,985 A |   | 10/1973 | Woodward ..................... 29/191 |
| 3,769,101 A |   | 10/1973 | Woodward .................... 148/127 |
| 4,148,669 A | * | 4/1979  | Tanner et al. ................. 148/538 |
| 4,221,257 A |   | 9/1980  | Narasimhan ................... 164/87 |
| 4,429,824 A |   | 2/1984  | Woodward .................... 228/157 |
| 4,715,525 A | * | 12/1987 | Norris .......................... 228/194 |
| 4,869,421 A | * | 9/1989  | Norris et al. .................. 228/181 |
| 5,199,631 A |   | 4/1993  | Anderson et al. ............. 228/181 |
| 5,618,359 A | * | 4/1997  | Lin et al. ...................... 148/403 |
| 6,149,051 A | * | 11/2000 | Vollmer et al. ............... 228/183 |
| 6,155,755 A | * | 12/2000 | Kanada et al. ................ 407/118 |

FOREIGN PATENT DOCUMENTS

| EP | 0456481 A2 | * | 11/1991 |
| JP | 59-126739 | * | 7/1984 |
| JP | 63-260686 | * | 10/1988 |
| JP | 03-106593 | * | 5/1991 |
| JP | 4-6175 | * | 1/1992 |

OTHER PUBLICATIONS

Derwent abstract for SU 1593748A, Pimenova et al., Sep. 1990, 1 page.*
Derwent abstract for RU 2077601 C1, Savchenko et al., Apr. 1997, 1 page.*
B.A. Kalin et al. "Brazing thin sheet structures of titanium alloys using CTEMET amorphous brazing alloys", Welding International, vol. 11, pp. 234–235, Abington Publishing, 1997.

* cited by examiner

Primary Examiner—John J. Zimmerman
(74) Attorney, Agent, or Firm—Baker Botts LLP

(57) ABSTRACT

A liquid interface diffusion bonded composition comprises a metal honeycomb core such as a titanium honeycomb core and a metal facing sheet such as a titanium facing sheet bonded thereto. The composition is prepared by a method comprising: (a) providing a metal honeycomb core having a faying surface and a metal facing sheet having a faying surface; (b) placing together the honeycomb core faying surface and the facing sheet faying surface, and providing therebetween a metal foil typically formed by a rapid solidification process or a melt spinning process, with the metal foil comprising about 10.5–12.5 wt. % zirconium, about 20–24 wt. % copper, about 10.5–16 wt. % nickel, and the balance being titanium; (c) subjecting the faying surfaces and metal foil therebetween to sufficient positive pressure to maintain position and alignment for joining; and (d) heating the faying surfaces and metal foil therebetween in a protective atmosphere to a temperature in the range of 1700–1800 degrees F. for at least 3 hours to cause a melt of the metal foil. The composition and method of this invention are useful in applications where high strength, lightweight materials are required, such as in aircraft and aerospace-related structures.

18 Claims, 3 Drawing Sheets

0.0035 in. GAGE Ti-3-2.5 HONEYCOMB BONDED TO 0.020 in.
Ti-6-4 FACE SHEET 0.001 in. LID (TiZrCuNi) ALLOY

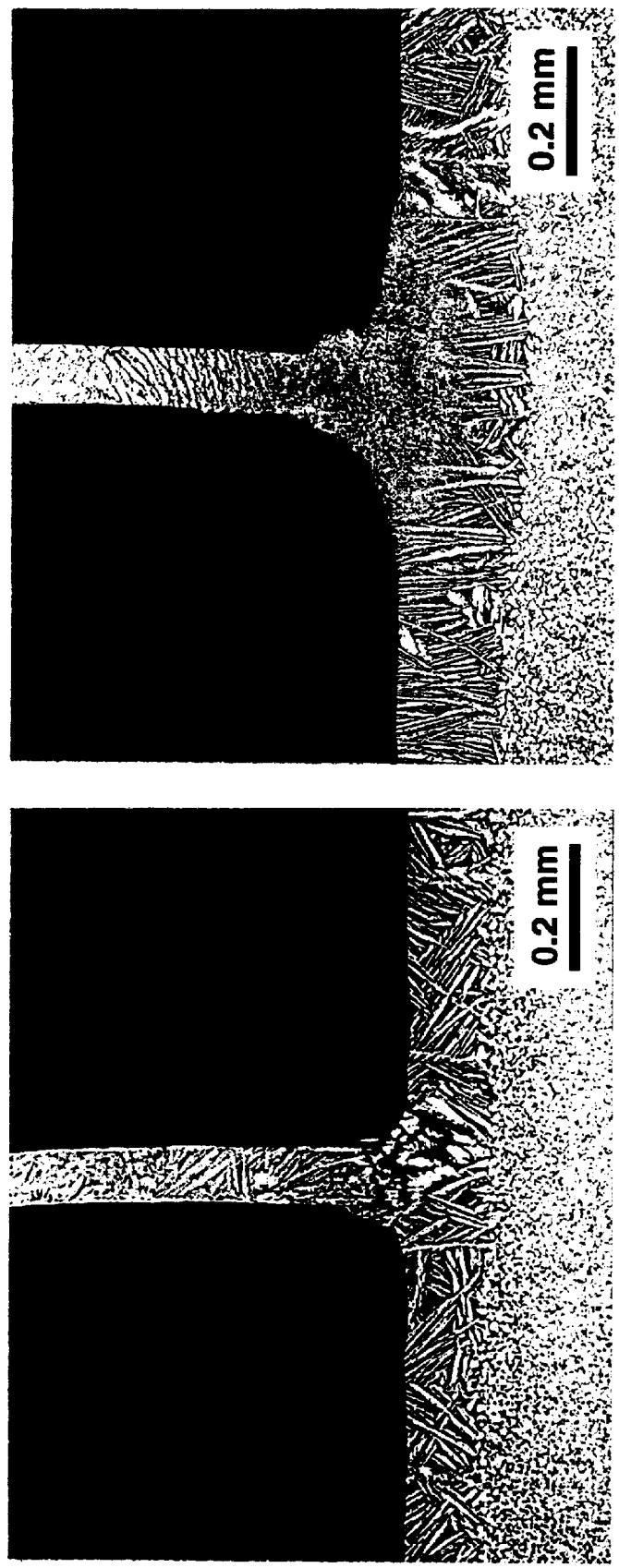

LIQUID INTERFACE DIFFUSION BONDED COMPOSITION AND METHOD

BACKGROUND OF THE INVENTION

1. Field of the Invention

This invention relates to a liquid interface diffusion bonded composition and a method of preparing such a composition. More particularly, this invention relates to a liquid interface diffusion bonded composition comprising at least one metal (e.g. titanium) honeycomb core which is bonded to a metal (e.g. titanium) facing sheet, wherein a foil interlayer comprising zirconium, copper, nickel and titanium is used to join the faying surfaces of the honeycomb core and facing sheet by being rendered liquid at the bonding temperature and thereby forming a liquid interface for effecting diffusion bonding of the core and facing sheet. The composition and method of this invention are useful where high strength, lightweight materials are required, such as in aircraft and aerospace-related structures.

2. Background Information

Brazing and diffusion bonding methods for the joining of honeycomb sandwich panels and other titanium structures are known to those skilled in the art. However, as described for example in U.S. Pat. Nos. 3,768 985 and 3,769,101, such brazing and diffusion bonding techniques have not been found entirely satisfactory, especially for joining titanium-based components such as joining a titanium honeycomb core material to a titanium facing sheet. In response to the problems associated with such brazing and diffusion methods, U.S. Pat. No. 3,768,985 describes a combined brazing and diffusion process referred to as a liquid interface diffusion (LID) process is described for joining a titanium honeycomb core and a titanium facing sheet bonded thereto. A brazing or filler material comprising 38% Cu, 38% Ni and a balance of Ag (by weight) is interposed between the faying surfaces of the honeycomb core and facing sheet, and the brazing material is rendered liquid at the brazing temperature to form a liquid interface between the faying surfaces which establishes the required metal-to-metal contact therebetween so that atomic transport can be effected and diffusion accelerated. In addition, U.S. Pat. No. 3,769,101 describes a LID process in which a small amount of three or more selected metals are interposed between the faying edges of the material to be bonded, to form a diffusion bridge. The selected metal may be Cu, Ni and Ag, or Cu, Ni and one low melting point metal selected from the group consisting of Sb, Bi, Cd, Sn, Zn, Au and Pt.

The use of amorphous Ti-based brazing alloys for diffusion bonding of thin sheet structures of titanium and its alloys is described in B.A. Kalin et al., "Brazing Thin Sheet Structures of Titanium Alloys Using CTEMET Amorphous Brazing Alloys," in Welding International, pp. 234–35, (1997). However, relatively short bonding times (i.e. 5–30 minutes) are described, which tend to limit the degree of atomic diffusion and homogenization of the joint formed between the honeycomb core and facing sheet.

Although the above-described LID processes are useful in overcoming the problems associated with traditional brazing and diffusion bonding methods, there are several additional problems associated with the LID process itself. For example, it is often difficult to achieve sufficient bonding of mismatched faying surfaces. In addition, disbonding of the surfaces after initial bonding also may occur, which may require post-processing repairs such as the introduction of pins and the like to join the surfaces with sufficient mechanical integrity. In view of the foregoing, it would be desirable to employ a LID process which is capable of sufficiently bonding slightly mismatched faying surfaces, and reduces the incidence of disbonding of the initially bonded surfaces and the concomitant necessity to use pins and the like to sufficiently join the surfaces.

This invention uses a relatively thick (0.0008–0.0012, preferably about 0.001 in.) foil interlayer of an alloy where Cu and Ni are diluted with Ti and Zr. This allows for a thicker braze foil interlayer than would be possible with an alloy of just Cu and Ni, particularly in applications involving the joining of thin gage titanium honeycomb materials. The thick foil interlayer provides advantages of decreasing the incidence of disbonds in slightly mismatched faying surfaces. The diluted composition also aids the dilution process during bonding. Moreover, the longer bonding times (i.e. at least 3 hours) used to prepare the composition of this invention enhances the degree of atomic diffusion and homogenization of the joint formed between the honeycomb core and facing sheet.

It is one object of this invention to provide a liquid interface diffusion bonded composition in which at least one metal honeycomb core is bonded to a metal facing sheet, wherein a foil interlayer comprising zirconium, copper, nickel and titanium is used to join the faying surfaces of the honeycomb core and facing sheet by being rendered liquid at the bonding temperature and thereby forming a liquid interface for effecting diffusion bonding of the core and facing sheet. It is another object of this invention to provide a method of preparing such a composition. The composition of this invention advantageously enables the bonding of such metal components, including the bonding of slightly mismatched faying surfaces of such components, and reduces the incidence of disbonding of the initially bonded surfaces and the concomitant necessity to use pins and the like to sufficiently join the surfaces. The composition and method of this invention are useful in applications where high strength, lightweight materials are required, such as in aircraft and aerospace-related structures.

SUMMARY OF THE INVENTION

The liquid interface diffusion bonded composition of this invention comprises a metal honeycomb core and a metal facing sheet bonded thereto, wherein the composition is prepared by a method comprising:

(a) providing a metal honeycomb core having a faying surface and a metal facing sheet having a faying surface;

(b) placing together the honeycomb core faying surface and the facing sheet faying surface, and providing therebetween a metal foil comprising about 10.5–12.5 wt. % zirconium, about 20–24 wt. % copper, about 10.5–16 wt. % nickel, and the balance being titanium;

(c) subjecting the faying surfaces and metal foil therebetween to sufficient positive pressure to maintain position and alignment for joining; and (d) heating the faying surfaces and metal foil therebetween in a protective atmosphere to a temperature in the range of 1700–1800 degrees F. for at least 3 hours to cause a melt of the metal foil.

In particularly preferred embodiments of the composition and method of this invention, the honeycomb core is a titanium honeycomb core, the facing sheet is a titanium facing sheet, and the metal foil is formed by a rapid solidification process or a melt spinning process. The composition and method of this invention are useful in applications where high strength, lightweight materials are required, such as in aircraft and aerospace-related structures.

BRIEF DESCRIPTION OF THE DRAWINGS

FIGS. 9A and 9B are micrographs of the compositions of Comparative Example 1 and Example 1 herein, respectively.

DETAILED DESCRIPTION OF THE INVENTION

As disclosed, for example, in U.S. Pat. Nos. 3,768,985 and 3,769,101 (both of which are incorporated herein by reference in their entireties), a LID process is a combined liquid and solid state diffusion process for the bonding of various structures, particularly those formed of titanium. Reference is now made to FIGS. 1–8 herein, which correspond to FIGS. 1–8 in each of U.S. Pat. Nos. 3,768,985 and 3,769,101.

Figure 1:
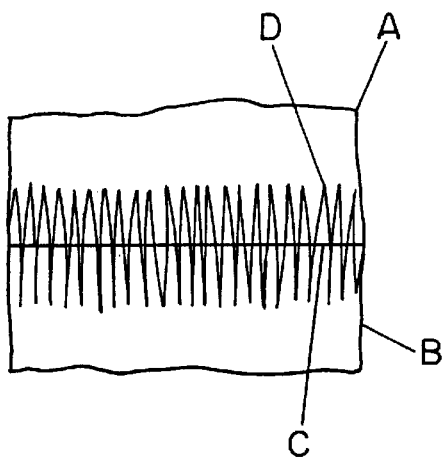
FIG. 1 is a graphic representation of the diffusion bonding of parts under ideal conditions.
Figure 2:
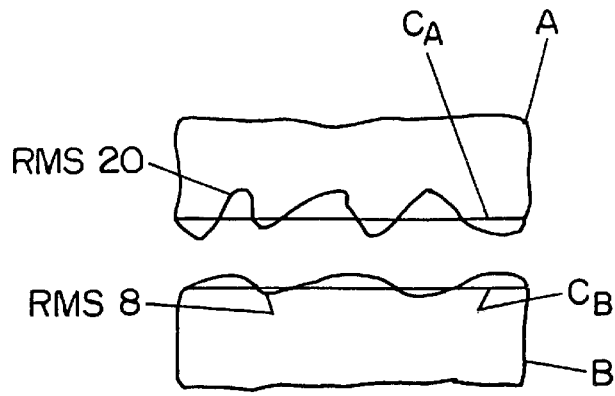
FIG. 2 is a graphic representation of the true surface condition of real parts.

In the theoretical showing of FIG. 1, it is assumed that parts A and B are perfectly flat and clean and fit together perfectly along their common surface or interface C. Under such ideal conditions, the spacing between the parts would be compatible with the interatomic distances between metal atoms, and instantaneous bonding of parts would occur without requiring atomic diffusion. Actually the parts are neither perfectly flat nor clean. As shown, in FIG. 2, in which micrographic portions of parts A and B are shown at many times magnification, the actual RMS 20 surface condition of part A deviates considerabl RMS 8 surface condition of part B also deviates from its nominal flat surface $C_B$. In order to achieve diffusion bonding as represented at D in FIG. 1, it normally becomes necessary to establish an ultraclean condition of the parts, and to employ high pressure and temperature for extended periods of time without causing gross deformation and degradation of mechanical properties which might result from use of excessive time, temperature, or pressure.

Figure 3:
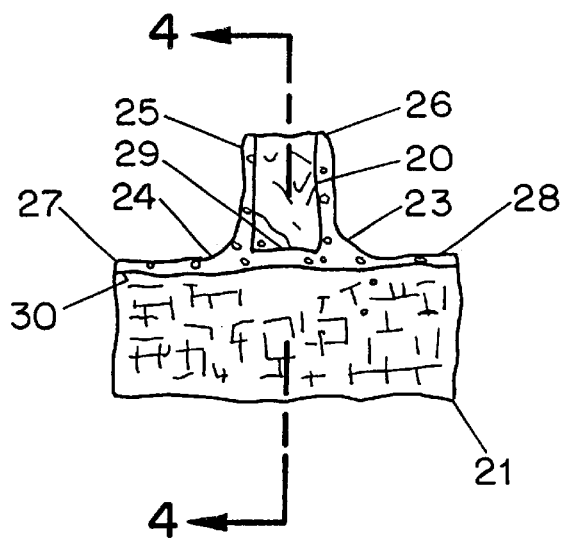
FIG. 3 is a graphic representation of a typical brazed joint.
Figure 4:
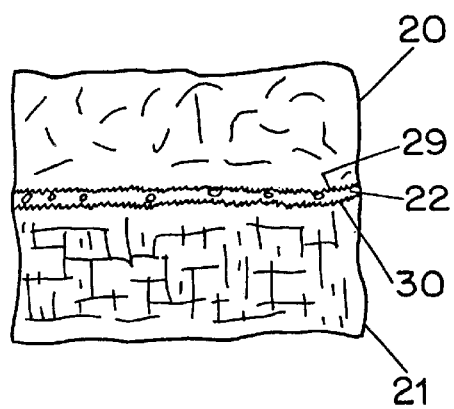
FIG. 4 is a sectional view of seen along the line 4—4 of FIG. 3.
Figure 5:
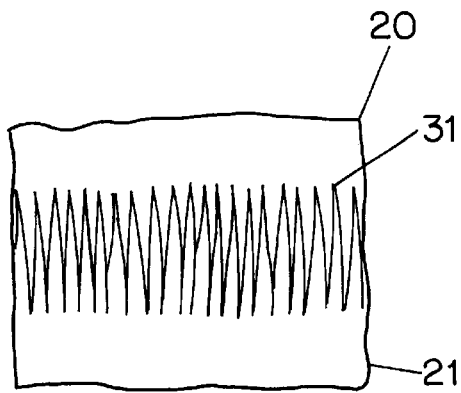
FIG. 5 is a graphic representation of the condition of complete dilution of the braze filler shown in FIG. 4.

A typical brazed joint of a honeycomb panel sandwich structure is disclosed in FIGS. 3 and 4 from which it may be seen that the honeycomb core wall 20 is joined to the facing sheet 21 by the brazing alloy 22 which desirably forms the joint strengthening fillets 23 and 24, but also often forms the undesired extended regions 25, 26 and 27, 28 which excessively add to the weight of the panel structure. The braze alloy actually adds an additional component to the joined assembly, and this component often lacks the desired physical properties of the basis materials.

The zigzag lines 29 and 30 depicted in FIGS. 3 and 4 at the interface of the braze alloy 22 with the core 20 and with the facing sheet 21 represent a condition in which more or less of the brazing material, as an incidence of the brazing operation, has diffused into the basis materials or has reacted therewith. A condition in which all of the braze alloy either fully reacted with the basis materials or has become diluted therewithin is represented at 31 in FIG. 5 as providing an undesirable zone in which degradation of the physical properties of the sandwich panel structure has occurred.

Figure 6:
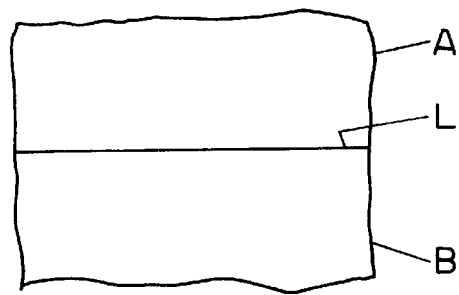
FIG. 6 is a graphical showing of the liquid interface and diffusion bridge at the faying surface of parts to be bonded in accordance with the method of the present invention.
Figure 7:
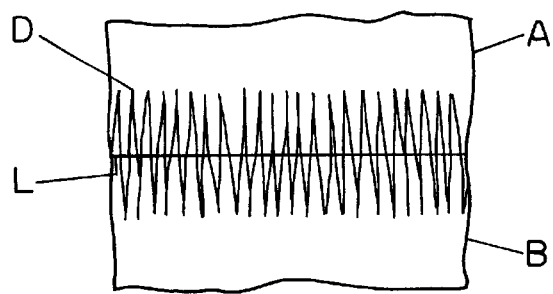
FIG. 7 is a graphical representation of the atomic diffusion and atom transport of the basis materials effected by the diffusion bridge of FIG. 6.
Figure 8:
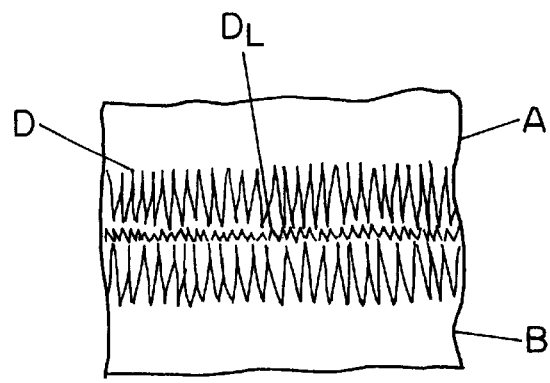
FIG. 8 is a graphical representation of the atom transport of FIG. 7 and additionally showing dilution of the bridge materials.

FIGS. 6 to 8 graphically represent features and resultant effects characteristic of the combined brazing-diffusion bonding process of the present invention and the bonded joint produced thereby. In FIG. 6, the line L represents a liquid interface at the faying surfaces of parts A and B which fills the interfacial voids, depicted in FIG. 2 at the surfaces of these parts, so that metal to metal contact, essential for the diffusion bonding, is established.

When the liquid interface and resultant diffusion bridge has become established, atomic diffusion takes place as depicted at D in FIG. 7; that is, atom transport of the basis materials of parts A and B occurs across the bonded joint represented by the liquid interface L. This diffusion occurs in what is referred to as the secondary or post diffusion phase of the LID process. Also occurring during this diffusion phase is the dilution by diffusion of the liquid interface or diffusion bridge material L into the region of the diffusion joint D as depicted at $D_L$ in FIG. 8.

The LID bonding method of this invention comprises:

(a) providing a metal honeycomb core having a faying surface and a metal facing sheet having a faying surface;

(b) placing together the honeycomb core faying surface and the facing sheet faying surface, and providing therebetween a metal foil comprising about 10.5–12.5 wt. % zirconium, preferably about 12 wt. % zirconium, about 20–24 wt. % copper, preferably about 24 wt. % copper, about 10.5–16 wt. % nickel, preferably about 12 wt. % nickel and the balance being titanium;

(c) subjecting the faying surfaces and metal foil therebetween to sufficient positive pressure to maintain position and alignment for joining; and (d) heating the faying surfaces and metal foil therebetween in a protective atmosphere to a temperature in the range of 1700–1800° F., preferably about 1720° F., for at least 3 hours, preferably about 3–6 hours, to cause a melt of the metal foil.

Although not limited thereto, the method of this invention is particularly applicable to the bonding of honeycomb sandwich panel structures formed from titanium and its alloys. Accordingly, in particularly preferred embodiments of the composition and method of this invention, the honeycomb core is a titanium honeycomb core, and the facing sheet is a titanium facing sheet.

As described above, the metal foil used in this invention to bond the metal honeycomb core and metal facing sheet is a metal foil comprising about 10.5–12.5 wt. % zirconium, preferably about 12 wt. % zirconium, about 20–24 wt. % copper, preferably about 24 wt. % copper, about 10.5–16 wt. % nickel, preferably about 12 wt. % nickel and the balance being titanium. In a particularly preferred embodiment of this invention, the metal foil is an amorphous, rapidly solidified or melt-spun metal foil formed by a rapid solidification process or a melt spinning process. Metal foils which may be employed in this invention include those described in U.S. Pat. No. 4,221,257, which is incorporated herein by reference in its entirety, and amorphous brazing alloy CTEMET 1201, available from Mifi-Ameto ofMoscow, Russia. The metal foil typically has a thickness in the range of 0.0008–0.0012 inches, and preferably has a thickness of about 0.001 inches.

In the method of this invention, the metal foil is placed between the honeycomb core faying surface and the facing sheet faying surface, and sufficient positive pressure is applied to that assembly to maintain position and alignment of the various assembly elements for joining. A suitable fixturing or tooling arrangement to accomplish this is set forth in FIG. 10 herein, which is also set forth and described at FIG. 11 and col. 8, line 32-col. 9, line 22 of U.S. Pat. No. 3,768,985. Other fixturing arrangements which may be used in conjunction with this invention include the application of positive pressure by flex-weight loading, differences in gas pressure (as described in U.S. Pat. No, 5,199,631, incorporated herein by reference), and the application of differences in the coefficient of thermal expansion of fixturing devices (as described in U.S. Pat. No. 4,429,824, incorporated herein by reference).

While such positive pressure is provided to the assembly, the assembly is heated in a protective atmosphere such as a vacuum furnace to a temperature in the range of about 1700–1800° F., most preferably about 1720° F. for at least 3 hours to cause a melt of the metal foil and bonding of the honeycomb core and facing sheet faying surfaces. In one preferred embodiment, the assembly is heated to a temperature of about 1700–1800° F. for at least 3 hours and thereafter cooled to room temperature. In another preferred embodiment, the assembly is heated to a temperature of about 1720 ° F. and held at that temperature for 3–6 hours and thereafter cooled to room temperature. In a particularly preferred embodiment, the assembly is heated in a protective atmosphere such as a vacuum furnace at a heating rate of about 10° F./min. to a temperature of about 1300° F., and thereafter further heated at a heating rate of about 5° F./min. to a temperature of about 1720 ° F. for about 3–6 hours, followed by cooling of the assembly to room temperature.

The method of this invention results in the formation of a liquid interface diffusion bonded composition comprising a metal honeycomb core and a metal facing sheet bonded thereto, wherein the region of the bonded joint therebetween comprises an interface comprising about 10.5–12.5 wt. % zirconium, preferably about 12 wt. % zirconium, about 20–24 wt. % copper, preferably about 24 wt. % copper, about 10.5–16 wt. % nickel, preferably about 12 wt. % nickel and the balance being titanium. The interface is provided by the liquid interface diffusion bonding of the above described metal foil to the metal honeycomb core and metal facing sheet. During the later stages of the process, after formation of the liquid interface, but before cooling to room temperature, the structure is homogenized so that the chemical composition of the interface more closely resembles that of the core and face sheet materials.

The composition and method of this invention are further illustrated by the following examples, which are not intended to limit the invention in any way.

EXAMPLE 1

A LID diffusion bonded panel was prepared from a 0.020 in. thick solid Ti-6-4 face sheet, a 0.5 in. high core made from 0.0035 in. thick Ti-3–2.5 foil ribbon, and a second 0.020 in. thick solid Ti-6–4 face sheet by placing the faying surfaces of the core and face sheets together, with a 0.001 in. thick metal foil having a nominal composition of 12 wt. % Zr, 24 wt. % Cu, 12 wt. % Ni, and the balance Ti (available as CTEMET 1201). The assembly was subjected to sufficient positive pressure to maintain position and alignment for joining, and the assembly was heated in a vacuum furnace as follows:

(1) Heated at 10° F./min. up to a temperature of 1300° F.;

(2) Subsequently heated at 5 ° F./min. up to a temperature of 1720 ° F.;

(3) Held at 1720° F. for 3 hours; and (4) Cooled to room temperature.

COMPARATIVE EXAMPLE 1

A LID diffusion bonded panel was prepared from a 0.020 in. thick solid Ti-6-4 face sheet, a 0.5 in. high core made from 0.0035 in. thick Ti-3–2.5 foil ribbon, and a second 0.020 in. thick solid Ti-6–4 face sheet by placing the faying surfaces of the core and face sheets together, with a 0.0002 in. thick metal foil having a nominal composition of 50 wt. % Cu, 50 wt. % Ni. The assembly was subjected to sufficient positive pressure to maintain position and alignment for joining, and the assembly was heated in a vacuum furnace as follows:

(1) Heated at 10° F./min. up to a temperature of 1300° F.;

(2) Subsequently heated at 5 ° F./min. up to a temperature of 1720° F.;

(3) Held at 1720° F. for 2 hours; and (4) Cooled to room temperature.

The mechanical properties of the bond panels of Example 1 (this invention) and Comparative Example 1 are set forth in Table 1:

Table 1

TABLE 1

| Test | | Example 1 | | Comparative Example 1 | |
| --- | --- | --- | --- | --- | --- |
| (Tests performed at room temperature, except where indicated otherwise) | Property & units | Value (Typ. basis) | No. of duplicate specimens | B-allowable Value[2] | No. of duplicate specimens |
| Flatwise tension | Failure stress (psi) | 2015 | 3 | 1534 | 10 |
| Face sheet tension | Y.S. (0.2% offset, ksi) | 143 | 3 | 100.9 | 10 |
| | UTS (ksi) | 150 | 3 | 107.8 | 10 |
| | Elongation (%) | 9.1 | 3 | — | — |
| Plate core shear (static) | Long, failure stress (psi) | 643 | 1 | 472[1] | 10 |
| | Trans., failure stress (psi) | 550 | 1 | 397[1] | 10 |
| Face sheet fatigue | Failure stress, 20K cycles (ksi) | 80 | 2 | 100 | |
| (30 Hz, R = +0.1) | Failure stress, 100K cycles (ksi) | 70 | 1 | 60 | |
| | Failure stress, 200K cycles (ksi) | 60 | 1 | 45 | |

TABLE 1-continued

| Test | | Example 1 | | Comparative Example 1 | |
|---|---|---|---|---|---|
| (Tests performed at room temperature, except where indicated otherwise) | Property & units | Value (Typ. basis) | No. of duplicate specimens | B-allowable Value[2] | No. of duplicate specimens |
| | Fatigue limit (ksi) | 50 | 3 | 38 | |
| Flatwise tension (600 F.) | Failure stress (psi) | 1309 | 3 | 1273 | 10 |
| Face sheet tension (600 F.) | Y.S. (0.2% offset, ksi) | 87.8 | 2 | 84 | 10 |
| | UTS (ksi) | 112.2 | 2 | 102 | 10 |
| | Elongation (%) | 10.3 | 2 | — | — |
| Plate core shear (600 F.) | Long., failure stress (psi) | 379 | 1 | 321 | 10 |
| | Trans., failure stress (psi) | 308 | 1 | 258 | 10 |
| Flatwise tension (1000 F.) | Failure stress | 1047 | 3 | — | |
| Face sheet tension (1000 F.) | Y.S. (0.2% offset, ksi) | 61.3 | 3 | 64 | 10 |
| | UTS (ksi) | 86.3 | 3 | 84 | 10 |
| | Elongation (%) | 12.8 | 3 | — | — |
| Plate core shear (1000 F.) | Long., failure stress (psi) | 292 | 1 | — | — |
| | Trans., failure stress (psi) | 250 | 1 | — | — |
| Random fatigue, (shaker table, cantilever beam specimen, core ribbon perpendicular to specimen axis) | Fatigue limit (RMS stress in ksi after 10,000,000 cycles) | 8.2 | | 6.8 (direct comparison, under identical conditions - not an allowable value) | |

[1]Values for panels with 0.016 in. thick perforated face sheet, 0.507 in. thick Ti-3-2.5 core, 0.020 solid face sheet
[2]Typically, B-allowables are less than average values Although this invention has been illustrated by reference to various specific embodiments, it will be apparent to those skilled in the art that various changes and modifications may be made which clearly fall within the scope of this invention. The invention claimed is:

1. A liquid interface diffusion bonded composition prepared by a method comprising:
   (a) providing a metal honeycomb core having a faying surface and a metal facing sheet having a faying surface;
   (b) placing together the honeycomb core faying surface and the facing sheet faying surface, and providing therebetween a metal foil comprising about 10.5–12.5 wt. % zirconium, about 20–24 wt. % copper, about 10.5–16 wt. % nickel, and the balance being titanium;
   (c) subjecting the faying surfaces and metal foil therebetween to sufficient positive pressure to maintain position and alignment for joining; and
   (d) heating the faying surfaces and metal foil therebetween in a protective atmosphere to a temperature in the range of 1700–1800° F. for at least 3 hours to cause a melt of the metal foil.

2. The composition of claim 1, in which the metal foil comprises about 12 wt. % zirconium, about 24 wt. % copper, about 12 wt. % nickel, and the balance is titanium.

3. The composition of claim 1, in which the metal foil has a thickness of about 0.0008–0.0012 inches.

4. The composition of claim 1, in which the metal foil has a thickness of about 0.001 inches.

5. The composition of claim 1, in which the honeycomb core is titanium and the facing sheet is titanium.

6. The composition of claim 1, in which the faying surfaces and metal foil therebetween are heated to a temperature of about 1700–1800 degrees F. for about 3–6 hours.

7. The composition of claim 1, in which the faying surfaces and metal foil therebetween are heated to a temperature of about 1700–1800 degrees F. for 3–6 hours and thereafter cooled to room temperature.

8. The composition of claim 1, in which the metal foil is formed by a rapid solidification process or a melt spinning process.

9. The composition of claim 6, in which the faying surfaces and metal foil therebetween are heated to a temperature of about 1720° F. for about 3–6 hours.

10. A liquid interface diffusion bonding method comprising:
   (a) providing a metal honeycomb core having a faying surface and a metal facing sheet having a faying surface;
   (b) placing together the honeycomb core faying surface and the facing sheet faying surface, and providing therebetween a metal foil comprising about 10.5–12.5 wt. % zirconium, about 20–24 wt. % copper, about 10.5–16 wt. % nickel, and the balance being titanium;
   (c) subjecting the faying surfaces and metal foil therebetween to sufficient positive pressure to maintain position and alignment for joining; and
   (d) heating the faying surfaces and metal foil therebetween in a protective atmosphere to a temperature in the range of 1700–1800 degrees F. for at least 3 hours to cause a melt of the metal foil.

11. The method of claim 10, in which the metal foil comprises about 12 wt. % zirconium, about 24 wt. % copper, about 12 wt. % nickel, and the balance is titanium.

12. The method of claim 10, in which the metal foil has a thickness of about 0.0008–0.0012 inches.

13. The method of claim 12, in which the metal foil has a thickness of about 0.001 inches.

14. The method of claim 10, in which the honeycomb core is titanium and the facing sheet is titanium.

15. The method of claim 10, in which the faying surfaces and metal foil therebetween are heated to a temperature of about 1700–1800 degrees F. for about 3–6 hours.

16. The method of claim 15, in which the faying surfaces and metal foil therebetween are heated to a temperature of about 1700–1800 degrees F. for 3–6 hours and thereafter cooling to room temperature.

17. The method of claim 15, in which the faying surfaces and metal foil therebetween are heated to a temperature of about 1720 degrees F. for about 3–6 hours.

18. The method of claim 10, in which the metal foil is formed by a rapid solidification process or a melt spinning process.

* * * * *